United States Patent
Ling et al.

(10) Patent No.: US 6,597,922 B1
(45) Date of Patent: Jul. 22, 2003

(54) METHOD AND APPARATUS FOR EFFICIENT CANDIDATE FREQUENCY SEARCH WHILE INITIATING A HANDOFF IN A CODE DIVISION MULTIPLE ACCESS COMMUNICATION SYSTEM

(75) Inventors: Fuyun Ling, San Diego, CA (US); Jack Holtzman, San Diego, CA (US); Charles E. Wheatley, III, Del Mar, CA (US); Tao Chen, San Diego, CA (US); Edward G. Tiedemann, San Diego, CA (US); Gilbert Leung, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/312,262

(22) Filed: May 14, 1999

(51) Int. Cl.$^7$ .................................................. H04B 7/00
(52) U.S. Cl. .......................... 455/522; 455/69; 455/436
(58) Field of Search .......................... 455/522, 69, 436, 455/439; 370/342, 331, 332, 335

(56) References Cited

U.S. PATENT DOCUMENTS

| | | | |
|---|---|---|---|
| 4,901,307 A | 2/1990 | Gilhousen et al. | 370/18 |
| 5,056,109 A | 10/1991 | Gilhousen et al. | 375/1 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,224,121 A * | 6/1993 | Schorman | 375/135 |
| 5,751,725 A | 5/1998 | Chen | 371/5.5 |
| 5,999,816 A * | 12/1999 | Tiedemann et al. | 455/437 |
| 6,314,126 B1 * | 11/2001 | Schilling et al. | 375/130 |
| 6,334,047 B1 * | 12/2001 | Andersson et al. | 455/69 |
| 6,381,461 B1 * | 4/2002 | Besson et al. | 455/450 |
| 6,493,333 B1 * | 12/2002 | Kim et al. | 370/342 |

FOREIGN PATENT DOCUMENTS

| | | |
|---|---|---|
| EP | 0667726 | 8/1995 |
| EP | 0773695 | 5/1997 |
| GB | 2314734 | 1/1998 |
| WO | 9729611 | 8/1997 |
| WO | 9740593 | 10/1997 |
| WO | 9941934 | 8/1999 |
| WO | 9960733 | 11/1999 |

OTHER PUBLICATIONS

Satarasinghe, P. "A Novel Method for CDMA Hard Handoff" IEEE 3: 1766–1768 (Globecom– Nov. 18, 1996).

* cited by examiner

Primary Examiner—Nguyen T. Vo
Assistant Examiner—Nghi H. Ly
(74) Attorney, Agent, or Firm—Philip R. Wadsworth; Kent D. Baker; Christopher Edwards

(57) ABSTRACT

A method and apparatus for efficient candidate frequency search while initiating a handoff in a code division multiple access communication system. The method includes when the pilot signal is transmitted by the mobile station that is power controlled to a target receive level, the traffic channel power level is increased relative to the pilot channel to improve receiver performance. An improved feature is that the received pilot received at the base station stays the same while the receiver receives extra energy in the redundant traffic symbols received to enhance the probability of correctly decoding the received frame. The base station detects the absence of the mobile station transmitted signal from the frequency of interest. If the base station is aware of the starting time and duration of the absence, it can focus its detection during this predetermined time period. The performance can be improved if the absence of the signal is spread across two frames at the frame boundary.

30 Claims, 6 Drawing Sheets

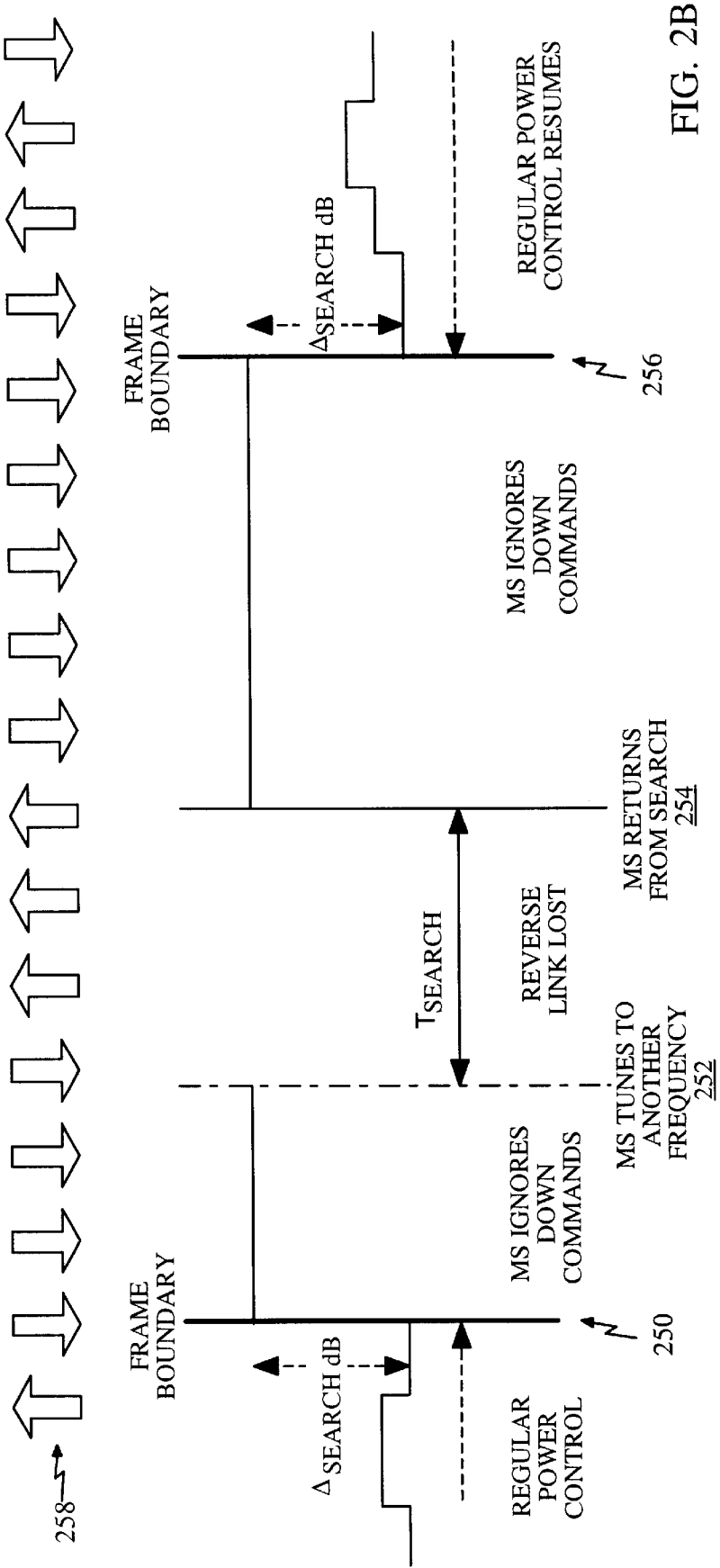

| DEGRADATION | 3ms FRAME-CENTER | 3 ms FRAME-BOUNDARY | 5 ms FRAME-CENTER | 5 ms FRAME-BOUNDARY |
|---|---|---|---|---|
| 1-PATH 120 KM/H | 0.80 | 0.30 | 1.05 | 0.55 |
| 2-PATH 120 KM/H | 0.65 | 0.30 | 1.15 | 0.40 |
| 1-PATH 30 KM/H | 0.95 | 0.40 | 1.35 | 0.55 |
| 2-PATH 30 KM/H | 0.70 | 0.28 | 1.35 | 0.48 |
| 1-PATH 3 KM/H | 0.75 | 0.40 | 0.90 | 0.55 |
| 1-PATH 3 KM/H | 0.45 | 0.28 | 0.82 | 0.48 |

FIG. 4

METHOD AND APPARATUS FOR EFFICIENT CANDIDATE FREQUENCY SEARCH WHILE INITIATING A HANDOFF IN A CODE DIVISION MULTIPLE ACCESS COMMUNICATION SYSTEM

BACKGROUND OF THE INVENTION

I. Field of the Invention

The present invention relates to digital wireless communication systems. More particularly, the present invention relates to a novel and improved method for scanning other-frequency pilot signals in a code-division multiple access (CDMA) communication system.

II. Description of the Related Art

In the field of wireless communications, several technology-based standards exist for controlling communications between a mobile station, such as a cellular telephone, Personal Communication System (PCS) handset, or other remote subscriber communication device, and a wireless base station. These include both digital-based and analog-based standards. For example, among the digital-based cellular standards are the Telecommunications Industry Association/Electronic Industries Association (TIA/EIA) Interim Standard IS-95 series including IS-95A and IS-95B, entitled "Mobile Station—Base Station Compatibility Standard for Dual-Mode Wideband Spread Spectrum Cellular System." Similarly, among the digital-based PCS standards are the American National Standards Institute (ANSI) J-STD-008 series, entitled "Personal Station—Base Station Compatibility Requirements for 1.8 to 2.0 GHz Code Division Multiple Access (CDMA) Personal Communication Systems." Other non-CDMA based digital standards include the time-division multiple access (TDMA) based Global System for Mobile Communications (GSM), and the U.S. TDMA standard TIA/EIA IS-54 series.

The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

Space or path diversity is obtained by providing multiple signal paths through-simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition in a CDMA wireless communication system. At various times when a wireless communication device such as a cellular or PCS telephone is energized, it undertakes an acquisition procedure which includes, among other things, searching for and acquiring the pilot channel signal from a base station in the wireless communication system. For example, demodulation and acquisition of a pilot channel in a CDMA system is described in more detail in copending U.S. patent application Ser. No. 08/509,721, entitled "METHOD AND APPARATUS FOR PERFORMING SEARCH ACQUISITION IN A CDMA COMMUNICATION SYSTEM," assigned to the assignee of the present invention and incorporated herein by reference. When more than one pilot channel can be acquired by the wireless communication device, it selects the pilot channel with the strongest signal. Upon acquisition of the pilot channel, the wireless communication device is rendered capable of acquiring additional channels from the base station that are required for communication. The structure and function of these other channels is described in more detail in the above referenced U.S. Pat. No. 5,103,459 and will not be discussed in detail herein.

The above standards and patents describe, among other things, the manner in which a mobile station is to execute a "handoff" between neighboring base stations as it travels between their respective geographic coverage areas. For example, in the CDMA-based standards IS-95 and J-STD-008, the base station sends a message to the mobile station listing many of the system parameters of its neighboring base stations, including such information as would assist the mobile station in executing an "autonomous" handoff between base stations. An autonomous handoff is one that is not initiated or directed by the base station, but rather is initiated by the mobile station itself.

An example of one such neighbor list message is the "Extended Neighbor List Message" of J-STD-008. When the base station sends an Extended Neighbor List Message to the mobile station, it uses the format of Table I.

TABLE I

| Field | Length (bits) |
| --- | --- |
| MSG_TYPE('00001110') | 8 |
| PILOT_PN | 9 |
| CONFIG_MSG_SEQ | 6 |
| PILOT_INC | 4 |
| Zero or more occurrences of the following record: | |
| NGHBR_CONFIG | 3 |
| NGHBR_PN | 9 |
| SEARCH_PRIORITY | 2 |
| FREQ_INCL | 1 |
| NGHBR_BAND | 0 or 5 |
| NGHBR_FREQ | 0 or 11 |
| RESERVED | 0–7 (as needed) |

The above table is taken from Section 3.7.2.3.2.14 of J-STD-008, and, indicates the various fields transmitted in an exemplary Extended Neighbor List Message. Of particular concern to the present invention are the following fields:

NGHBR_PN—the base station sets this field to the pilot PN sequence offset for this neighbor, in units of 64 PN chips; and NGHBR_FREQ—the base station sets this field to the CDMA channel number corresponding to the CDMA frequency assignment for the CDMA channel containing the paging channel that the mobile station is to search.

Thus, according to J-STD-008, the mobile station is given the frequency and PN offset of each neighboring base station. This gives the mobile station enough information to make a more focused search for neighbor pilots, rather than having to search all possible PN offsets on all possible CDMA frequency assignments. For example, the mobile station may keep a table of all the neighbors that were passed to it in the neighbor list message or extended neighbor list message. Such a table might resemble Table II below.

TABLE II

| PN Offset (chips) | Frequency |
| --- | --- |
| 12 | f(1) |
| 24 | f(1) |
| 48 | f(1) |
| 12 | f(2) |

With respect to "same-frequency neighbors," i.e. those that are on frequency f(1), the very nature of a CDMA modulation scheme allows a mobile station with a diversity receiver such as that described in the above-mentioned U.S. Patent No. 5,109,390 to search for other pilot signals on the same frequency assignment, but having different PN offsets, while simultaneously continuing to demodulate any channel that it is already monitoring. In other words, a CDMA mobile station is typically able to search for the pilot signals of other base stations on the same frequency assignment, without interrupting transmission or reception of data with its original base station.

However, a significant problem remains with regard to acquiring "other-frequency neighbors," i.e. those that are on frequency f(2). Namely, if a neighboring base station's pilot is on a different frequency assignment, the mobile station is required to re-tune its synthesizer to that other frequency in order to receive and demodulate that other-frequency neighbor's pilot channel. During the time that it takes to re-tune, acquire, and determine whether that other-frequency neighbor is a good candidate for handoff, the mobile station is unable to either receive or transmit on its original frequency assignment. Clearly, this would cause undesirable problems such as missed information on the original frequency.

For example, suppose the mobile station has re-tuned its synthesizer to search for a particular other-frequency neighbor's pilot signal during the time that an incoming page addressed to the mobile station is being transmitted by the original base station. In such a case, the mobile station would miss the page, and therefore could not complete an incoming call. Furthermore, this would be undetectable by the mobile station's user, who would never be aware that he had missed an incoming call because the mobile station had temporarily re-tuned to the other frequency.

What is needed is a method and apparatus for scanning other-frequency neighbors which avoids missing incoming messages from the original base station.

SUMMARY OF THE INVENTION

The present invention is a novel and improved method and apparatus for detecting a signal on a second frequency while monitoring a first frequency. The pilot signal is transmitted by the mobile station that is power controlled to a target receive level, the traffic channel power level is increased relative to the pilot channel to improve receiver performance. An improved feature is that the pilot received at the base station stays the same while the receiver receives extra energy in the traffic symbols received to enhance the probability of correctly decoding the received frame. The base station detects the absence of the mobile station transmitted signal from the frequency of interest. If the base station is aware of the starting time and duration of the absence, it can focus its detection during this predetermined time period. The performance can be improved if the absence of the signal is spread across two frames at the frame boundary.

The method and apparatus include steps and means for controlling transmit power for improving receiver performance by ensuring sufficient transmit power during a candidate frequency search while conducting a handoff between cells by forming a signal for transmission with interleaved redundant information (voice or data) to a mobile station from the first external station on a first frequency at a first set power level; transmitting the signal to a mobile station from the first external station on the first frequency at a second power level above the first set power level when the mobile station is tuned to the first frequency prior to tuning to the second frequency. Additionally included is transmitting information to the mobile station on a second frequency from the second external base station, the mobile station having tuned from the first frequency to the second frequency.

The apparatus of the present invention may be used in a wireless communication receiver, in a first embodiment referred to herein as a mobile station and may also be present in a base station.

BRIEF DESCRIPTION OF THE DRAWINGS

FIG. 2b illustrates in timeline fashion an embodiment of the present invention.

FIG. 4 illustrates simulation results of the improved performance of spreading the absence of the signal across two frames at the frame boundary.

DETAILED DESCRIPTION OF THE PREFERRED EMBODIMENTS

Figure 1:
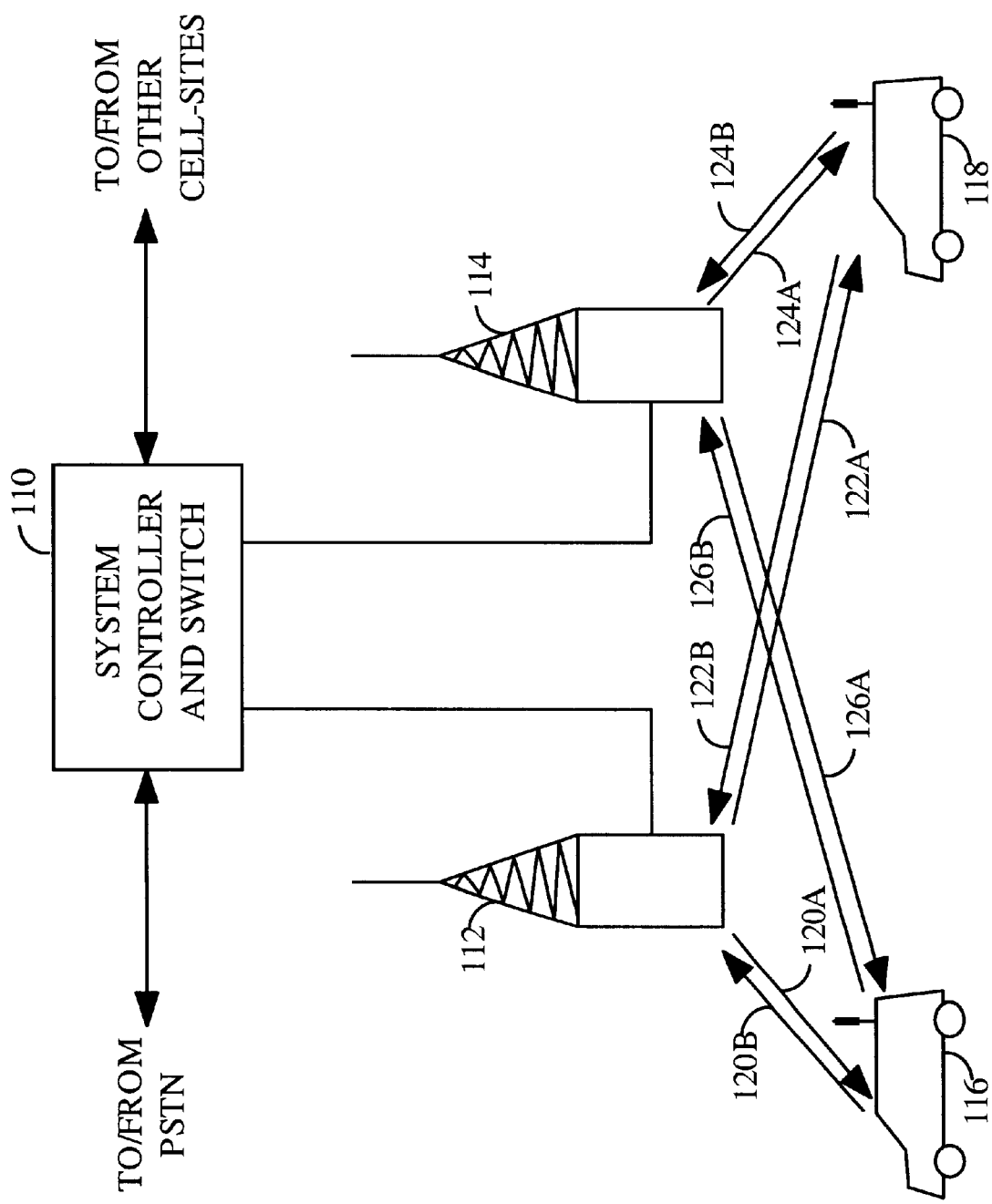
FIG. 1 illustrates a radiotelephone communication system in which the preferred embodiment of the present invention resides and operates.

Referring to FIG. 1, system controller and switch 110, also referred to as a mobile telephone switching office (MTSO), typically includes interface and processing circuitry for providing system control to the cell-sites. Controller 110 also controls the routing of telephone calls from a public switched telephone network (PSTN) to an appropriate cell-site for transmission to an appropriate mobile or subscriber unit. Controller 110 also controls the routing of calls from the mobile or remote subscriber units, using at least one cell-site, to the PSTN. Controller 110 may connect or link calls between subscriber users using the appropriate base stations since the subscriber units do not typically communicate directly with one another.

Controller 110 may be coupled to the cell-sites by various means such as dedicated telephone lines, optical fiber links, or microwave communication links. In FIG. 1, two such exemplary cell-sites 112 and 114 are shown along with mobile units 116 and 118, where each mobile unit includes a cellular telephone. Exemplary cell-sites 112 and 114, as discussed herein and as illustrated in the drawings, are considered as providing service to an entire cell. However, it should be understood that a cell may be geographically divided into sectors with each sector providing service to a different coverage area. Accordingly, handoffs are generally required to be made between sectors within a cell, while diversity may also be achieved between sectors as is done between cells.

In FIG. 1, lines 120a–120b and 122a–122b, along with their respective arrowheads, correspond to signal transmission, which includes data transmission over various traffic channels, between cell-site 112 and mobile units 116 and 118, respectively. Similarly, lines 124a–124b and 126a–126b represent communication between cell-site 114 and mobile units 118 and 116, respectively. Cell-sites 112 and 114 nominally transmit using equal power.

The coverage of cell-site service areas or cells is designed or laid out in geographic shapes such that the mobile units will normally be closest to one cell-site, and within only one sector if cell is divided into sectors. When the mobile unit is idle, i.e. no calls in progress, the mobile unit constantly monitors pilot signal transmissions from each nearby cell-site, and, if applicable, from a single cell-site if the cell is sectorized. Mobile unit 116 can determine which cell it is in by comparing signal strength for pilot signals transmitted from cell-sites 112 and 114.

In the example illustrated in FIG. 1, mobile unit 116 may be considered closest to cell-site 112. When mobile unit 116 initiates a call, a control message is transmitted to the nearest cell-site, here cell-site 112. Cell-site 112, upon receiving the call request message, transfers the called number to system controller 110. System controller 110 then connects the call through the PSTN to the intended recipient.

Should a call be initiated within the PSTN, controller 110 transmits the call information to all of the cell-sites in the area. The cell-sites in return transmit a paging message within each respective coverage area that is intended for the called recipient mobile user. When the intended recipient mobile unit "hears" or receives the page message, it responds with a control message that is transmitted to the nearest cell-site. This control message signals the system controller that this particular cell-site is in communication with the paged mobile unit. Controller 110 then routes the call through this cell-site to the mobile unit. Should mobile unit 116 move out of the coverage area of the initial cell-site, 112, an attempt is made to continue the call by routing the call through another cell-site.

In the exemplary system of FIG. 1, orthogonal Walsh functions are assigned to user channels on the cell-to-subscriber link. In the case of voice channels, the digital symbol stream for each voice signal is multiplied by its assigned Walsh sequence. The Walsh coded symbol stream for each voice channel is then multiplied by the outer PN coded waveform. The resultant spread symbol streams are then added together to form a composite waveform. Another embodiment of the present invention includes assigning orthogonal Walsh functions on the subscriber-to-cell link.

The resulting composite waveform is then modulated onto a sinusoidal carrier, bandpass filtered, translated to the desired operating frequency, amplified and radiated by the antenna system. Alternate embodiments of the present invention may interchange the order of some of the operations just described for forming the cell-site transmitted signal. For example, it may be preferred to multiply each voice channel by the outer PN coded waveform and perform the filter operation prior to summation of all the channel signals which are to be radiated by the antenna. It is well known in the art that the order of linear operations may be interchanged to obtain various implementation advantages and different designs.

The waveform design of the preferred embodiment for cellular service uses the pilot carrier approach for the cell-to-subscriber link, as is described in U.S. Pat. No. 4,901,307. All cells transmit a pilot carrier using the same 32,768 length sequence, but with different timing offsets to prevent mutual interference.

As is described in greater detail below, the symbol stream for a particular cellular user is combined in a first exclusive OR operation with the Walsh. sequence assigned to that user. The Walsh function is typically clocked at a rate of 1.2288 MHz, 3.6864 MHz or 4.096 MHz while in an exemplary variable data rate system including voice, facsimile (FAX), and high/low-speed data channels the information symbol rate may vary from approximately 75 Hz to 76,800 Hz. The resulting coded waveform is combined in a second exclusive OR operation with a binary PN sequence also clocked at 1.2288 MHz. Another embodiment of the present invention includes a clock sequence in the range of 3–5 Mhz or above. Specifically, a preferred embodiment includes the rates of 3.6864 Mhz and 4.096 Mhz. An identical binary PN sequence is used to encode each subscriber channel within a particular sector of the coverage area of the cellular system. As a consequence of the orthogonality of the Walsh coding sequences, each sequence may be used to process user data on a single RF channel associated with such a sector without inducing interference among the users within the sector.

Prior to application of Walsh coding, the signals carried by each channel may also be convolutional or Turbo encoded, with repetition, and interleaved in order to provide error detection and correction functions which allow the system to operate at a much lower signal-to-noise and interference ratio. Techniques for convolutional or Turbo encoding, repetition, and interleaving are well known in the art. The resulting signals are then generally modulated onto an RF carrier and summed with the pilot and setup carriers, along with the other voice carriers. Summation may be accomplished at several different points in the processing such as at the IF frequency, or at the baseband frequency either before or after multiplication by the PN sequence associated with the channels within a particular cell.

Each voice/data carrier may also be multiplied by a value that sets its transmitted power relative to the power of the other voice carriers. This power control feature allows power to be allocated to those links that require higher power due to the intended recipient being in a relatively unfavorable location. Means are provided for the subscribers to report their received signal-to-noise ratio to allow the power to be set at a level that provides for adequate performance without wasting power. The orthogonality property of the Walsh functions is not disturbed by using different power levels for the different voice carriers provided that time alignment is maintained.

A preferred embodiment of the present invention includes coherent demodulation and fast power control of both the forward and reverse links. Optionally, the preferred embodiment may be, but need not be, backwards compatible with IS-95 series of related standards.

Figure 2A:
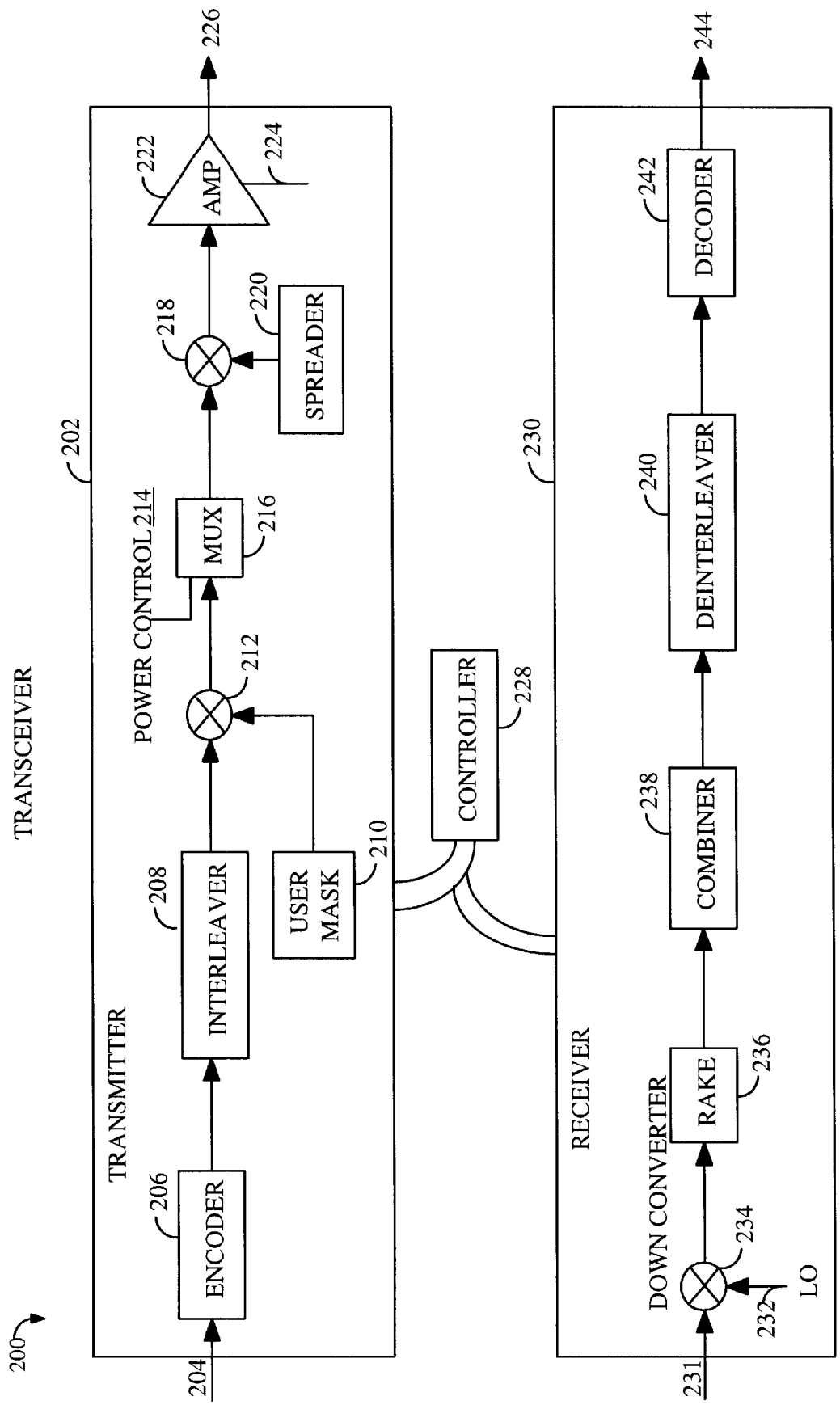
FIG. 2a illustrates a transceiver block diagram of an embodiment of the present invention.

Turning now to FIG. 2a, a transceiver in an embodiment of the present invention is illustrated. The transceiver may be a mobile station or an essentially fixed external (base) station. Input data 204 typically includes a vocoded voice or data signal. The signal is then convolutionally encoded in encoder 206 where redundant information bits are added for forward error correction. The resultant data signal is then directed into interleaver 208 where the signal is then interleaved through time diversity to reduce the effect of fast fading on the signal at the eventual receiver. The interleaved signal is combined in mixer 212 with a user mask 210 at a frequency of interest decimated to a lower frequency, typically 19.2 kbps for identification purposes. In a preferred embodiment, the frequency of interest is selected from (although not restricted to) a range of frequencies between 1 MHz and 5 MHz, but is preferably 1.2288 MHz, 3.6864 MHz or 4.096 MHz.

The signal output from mixer 212 is optionally combined in mux 216 with a power control signal 214 that is punctured into the signal before being sent to mixer 218. In mixer 218 the signal is combined with a signal from spreader 220 at a frequency of interest as above, which in the preferred embodiment of the invention is of the same frequency, though it need not be. Spreader 220 contains a Walsh code generator operating at the frequency of interest.

The resultant signal is sent to amplifier 226 whose power output level is controlled by controller 228 by way of power control signal input 224. Operation of controller 228 will be described in detail below with reference to FIGS. 3a and 3b.

Spreader 220 may be similar to that found in a forward or reverse link as described in IS-95. Specifically, the forward link and also reverse link may use orthogonal Walsh codes to separate the different user channels, or alternatively, different channels for the same user. An embodiment of the invention uses orthogonal Walsh codes to separate the different user channels instead of using the Walsh encoding to reduce intersymbol interference. Additionally, the reverse (mobile-to-base station) link optionally utilizes coherent demodulation at the external base station.

Additionally, since both the reverse and forward links in an embodiment of the invention utilize coherent demodulation, transceiver 200 may be located within the mobile station and/or the external base station.

At the receiver 230, input signal 231 arrives at downconverter mixer 234 where it is combined with variable local oscillator 232. A multi stage downconversion apparatus and process are illustrated in a single stage for simplicity. The downconverted signal is passed to RAKE receiver 236 for coherent demodulation of various received multipath signals. The received signals are then passed to combiner 238 where the signals are added in phase before being passed to deinterleaver 240. The signal is then sent to decoder 242 and the final output signal 244 is passed from receiver 230. Controller 228 contains all the functionality required to control both receiver 230 and transmitter 202.

Referring now to FIG. 2b, regular power control operations on the reverse link are conducted prior to the time frame boundary 250 is encountered. At frame boundary 250, the mobile station increases its transmitted power by a predetermined amount $\Delta_{search}$ dB. The power increase overcomes the loss of redundant symbols during time period $t_{search}$. During this frame, the mobile station ignores commands from the base station concerning power control down commands 258. The mobile station tunes to another frequency at time 252 for a predetermined period $t_{search}$ in search of another possible handoff frequency in another cell. At this time, the reverse link is lost. At time 254, the mobile station returns from searching for another potential frequency. At frame boundary 256, regular power control operations resume.

Figure 3A:
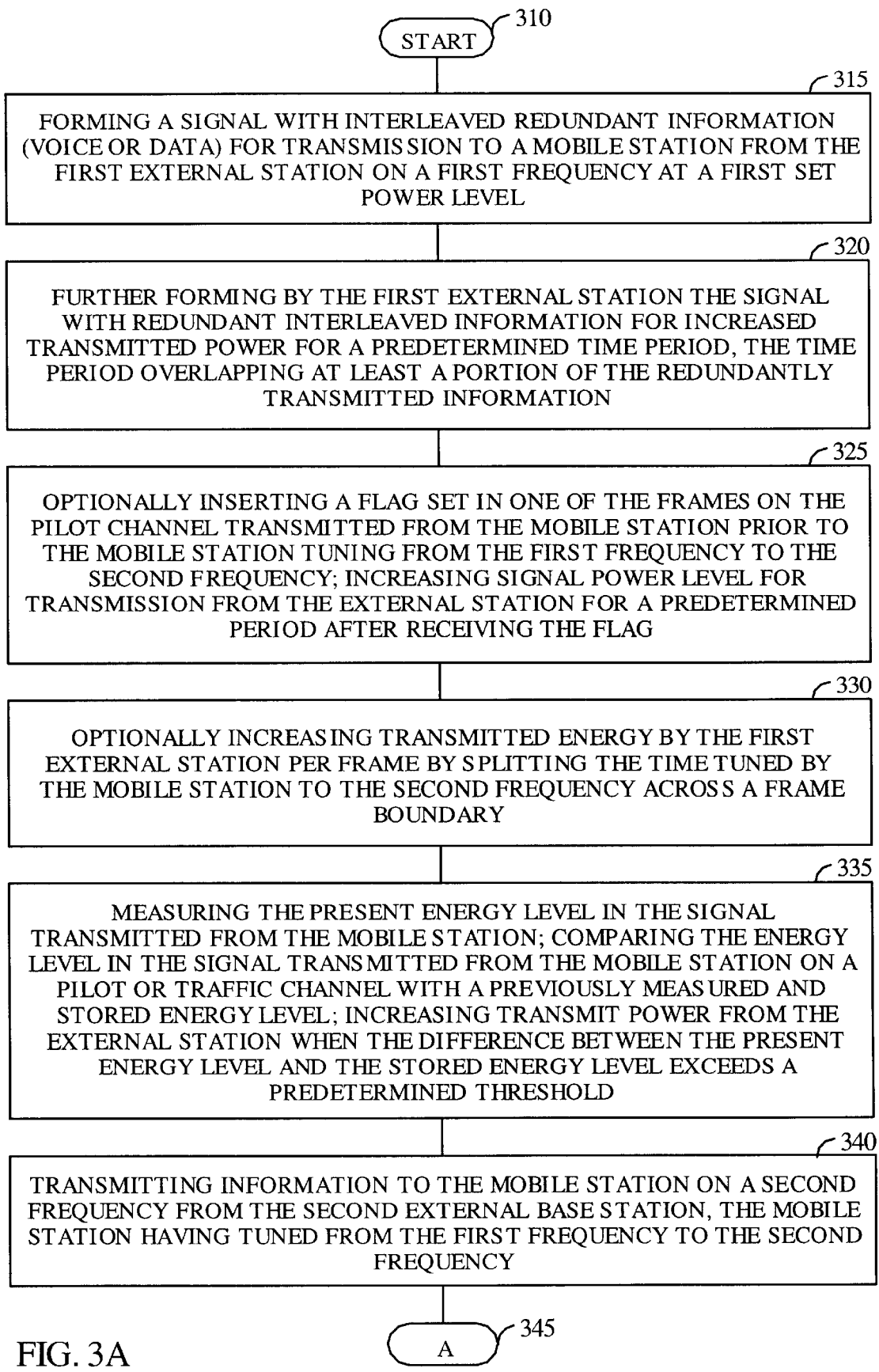
FIG. 3a illustrates in flowchart format the method of operation of a preferred embodiment of the present invention.
Figure 3B:
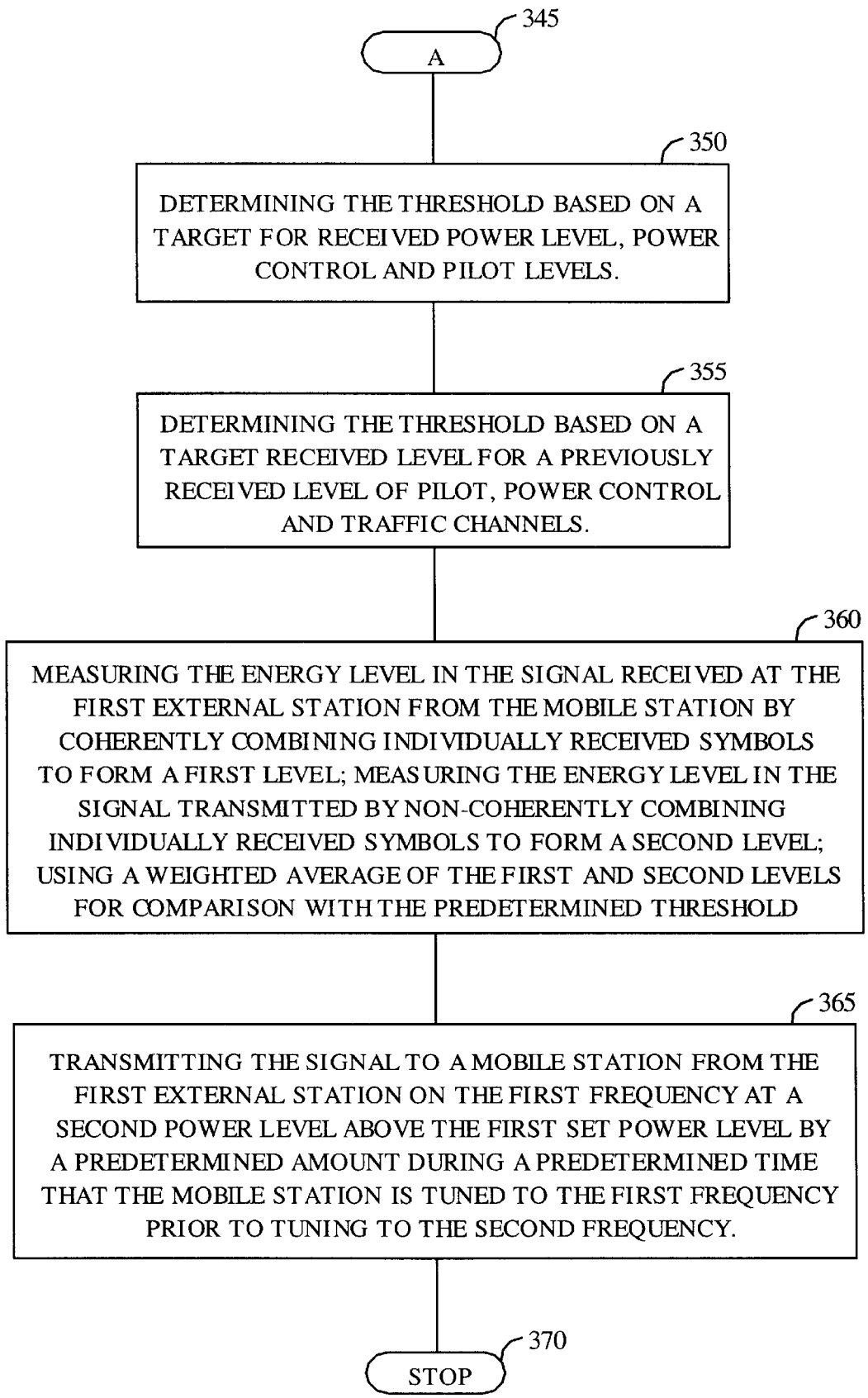
FIG. 3b illustrates in flowchart format the method of operation of a preferred embodiment of the present invention.

Referring now to FIGS. 3a and 3b, in general the operation of a mobile station with a single radio frequency transceiver front end during a candidate search is described. The front end is capable of tuning to one of multiple candidate frequencies upon the direction of the controller. Target frequencies and timing of possible interfrequency handoffs are determined. The exact timing of the absence from the serving frequency need not be known a priori by the external base stations in communication with the mobile stations.

To improve the receiver performance and/or to reduce power consumption or capacity, a few different techniques can be utilized to determine the absence of a signal at a desired frequency. The external base station can detect if the signal is not present. The base station then may set the corresponding symbols as erasures indicating the information is to be discarded upon reception at the decoder. The base station can also change the forward link traffic channel gain for the mobile station so that limited energy is transmitted during the absence and that extra energy is transmitted while the signal is present at the desired frequency.

When the pilot signal is transmitted by the mobile station that is power controlled to a target receive level, the traffic channel power level is increased relative to the pilot channel during the partial frame the mobile station is transmitting on the serving frequency to improve receiver performance. An improved feature is that the pilot received at the base station stays the same while the receiver receives extra energy in the traffic symbols received to enhance the probability of correctly decoding the received frame.

The base station detects the absence of the mobile station transmitted signal from the frequency of interest. If the base station is aware of the possible starting times and duration of the absence, it can focus its detection during this predetermined time period. If the time and duration is unknown, then monitoring is conducted continuously. The detection is carried out in a number of ways, according to several embodiments of the invention. One embodiment includes measuring the energy in the traffic channel and/or power control sub channel by combining the multipath signals received at the RAKE receiver. Another method includes measuring the energy in the pilot channel after coherently combining the multipath signals. Yet a third embodiment includes using a weighted sum of two or more of the outputs of the above techniques.

Once the energy measurement has been made, it is compared with a fixed predetermined threshold based on one of the following: the target received levels for traffic, power control and pilot channels; the past measurement of these channels where energy is either known or estimated; or a weighted sum of the outputs of the above two techniques.

Another embodiment of the present invention includes a method and apparatus for the mobile station to signal the base station prior to beginning a candidate search on a different frequency. This is done by setting a flag on the pilot channel at a specified time. The time includes one of the frames preceding the frame in which the candidate search is conducted. It may also be sent during or after the partially absent frame.

When the base station knows a priori the portion of the frame where the mobile station transmitted frame is possibly not present, the base station then decodes with all symbols present. If desired, the base station optionally sets the symbols in the absent portion of the frame to erasures and decodes the remaining frame to improve frame detection.

In another embodiment of the invention, if a first decode fails with all symbols present, then the decoder is set to try to decode the same frame again without the symbols received during the already known possible search times.

Additionally, for any time period where the signal is absent for one frame or less, or between two and three frames, then the absence may optionally be set to span across two (or more) frames to lessen the impact per frame. The absence is centered on the frame boundary in a preferred embodiment. Should the absence be between one and two frames, or between three and four frames in length, then the absence is centered on the middle of a frame.

For traditional forward link power control, the mobile station increases its forward link target $E_b/N_o$ by $\Delta_{target}$ dB several power control groups prior to beginning the interfrequency search. The exact $\Delta_{target}$ $E_b/N_o$ increase and the number of power control groups within a frame affected prior to the search depends on $t_{search}$. The loss of the forward link symbols during the absence is similar to that of a deep fade. The additional power received on the forward link allows for overcoming the lost symbols during the time tuned to a different frequency $t_{search}$. During the search the base station still interprets invalid forward link power control commands. Therefor, the power control status after period $t_{search}$ is unpredictable. Additionally, the authorized increase $\Delta_{target}$ is limited and may not extend beyond the frame containing the interfrequency search.

For traditional reverse link power control, the mobile station increases transmit power by $\Delta_{search}$ dB to compensate for the loss of the reverse link symbols during $t_{search}$. The power control down commands are ignored by the mobile station and thus the power increase $\Delta_{search}$ depends on the speed of the interfrequency search and is limited to reduce reverse interference.

The position of the start of the interfrequency search is optionally randomized within a frame by using the current state of the User Long Code. A staggered search excursion minimizes reverse link interference and simultaneous forward link power ramp up. When the search excursion extends over a frame boundary, the mobile station on the reverse link increases the transmission power of the following frame by an amount less than $\Delta_{search}$ dB to make up for the loss of the first symbols of the frame. On the forward link, the mobile station increases the target $E_b/N_o$ by an amount less than $\Delta_{target}$ dB to make up for the loss of the first symbols of that frame.

If $t_{search}$ (the total time tuned to another frequency) is kept small, the frame can still be demodulated correctly while the mobile station performs the interfrequency search. The different parameters impacting $t_{search}$ are implementation dependent. The threshold corresponds to a maximum value of $t_{search}$ where a mobile station can still recover the forward link and reverse link frame without inducing excessive interference.

Specifically, the candidate frequency search process begins in item 310 labeled START. Control passes to item 315 where the transmitter forms a voice or data signal for transmission to a mobile station from the base station. The transmission is at a first frequency where communication takes place and is at a predetermined power level that is set by the reverse link power control process of IS-95 in a preferred embodiment. In a second embodiment, the previously used reverse link power control process is similar to the forward link power control process. In step 320, the signal is modified by interleaving the redundant information introduced by the encoder according in a time division fashion. The signal is boosted in power for the time period in which the signal is tuned to the first frequency and is conducting a voice or data call with the mobile station. The data that is transmitted is boosted in power to improve signal to noise ratio thus increasing the probability of correctly receiving and decoding the transmitted information.

In step 330, the mobile station optionally sets a flag in one of the frames prior to its transmission to notify the base station that the mobile is about to begin its candidate frequency search prior to a hand-off initiation. The flag is set in the pilot channel in the frame or frames before the mobile station tunes from its primary frequency in search of a hand-off frequency. The base station may also optionally increase the energy transmitted to a mobile station by staggering the transmission evenly across multiple frames at the frame boundary. The energy per frame is thus evenly distributed across each frame resulting in a lower probability of error in a single frame.

The base station measures the energy level present in the signal transmitted from the mobile station and received by the base station beginning in step 335. The received energy level on either a traffic or pilot channel is compared against a previously measured or estimated energy level. The mobile station receives feedback on the closed loop reverse power control mechanism and decreases its transmit energy when the comparison exceeds a predetermined level.

In step 340, a second base station transmits information to a mobile station after it has tuned to a second frequency in search of a new base station operating at that second frequency prior to a handoff. That second frequency is known to the first base station and is configured individually per each system. The first base station transmits the numeric information to the mobile station in overhead information or in the traffic channel prior to the mobile station tuning to the second frequency.

Control then passes to steps 350 and then 355 where the threshold targets are set based on received power, power control and pilot levels and previously received received power, power control and pilot levels, respectively.

There are several methods for measuring the received energy level at the base station in a preferred embodiment of the present invention. In step 360, the received signal is coherently combined to deduce a first received power level. The signal is also optionally received non-coherently to form a second received power level. The first and second levels are then combined using a weighted average and then compared with the predetermined threshold.

In step 365, the signal is then transmitted from the first station to the mobile station on the first frequency at the power level above the first power level during the time the mobile station is tuned to the first frequency. Transmissions during the interval the mobile is tuned to the second frequency are not received and optionally the base station may blank transmission during that time period to save power and reduce overall system interference resulting in increased system capacity. Control then passes to STOP at step 370 and the process is repeated.

It should be noted that one embodiment of the invention includes the feature of keeping the pilot signal energy constant while increasing the overall transmitted energy.

Additionally, another embodiment includes the feature and capability of decoding according to the normal methodology and optionally removing a signal and re-decoding when the original decoding fails.

Referring now to FIG. 4, the degradation of the signal is reduced by roughly half when the absence of the signal is spread across two frames at the frame boundary. For various paths at 9600 bps the improvement ranged 0.3 dB at 120 km/hr with a 3 ms frame boundary to 1.15 dB gain with a 5 ms frame center. For 3 km/hr, the improvement ranged from 0.28 dB with a 3 ms frame boundary to 1.35 dB with a 5 ms frame center. For 30 km/hr, the improvement ranged from 0.28 dB with a 3 ms frame boundary to 0.9 dB with a 5 ms frame center.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a radiotelephone system including a mobile station and a first and second external stations which utilizes redundant data transmission, a method of controlling transmit power for improving receiver performance by ensuring sufficient transmit power during a candidate frequency search while conducting a handoff between cells comprising the steps of repeatedly:
    a) forming a signal for transmission with interleaved redundant information (voice or data) to a mobile station from said first external station on a first frequency at a first set power level;
    b) transmitting the signal to a mobile station from said first external station on the first frequency at a second power level above the first set power level by a predetermined amount during a predetermined time that the mobile station is tuned to the first frequency prior to tuning to the second frequency; and
    c) transmitting information to the mobile station on a second frequency from said second external base station, the mobile station having tuned from the first frequency to the second frequency.

2. The method of claim 1 further including the steps of: prior to tuning to the second frequency, transmitting by said first external. station the signal with redundant interleaved information increased in transmitted power for a predetermined time period, the time period overlapping at least a portion of the redundantly transmitted information.

3. The method of claim 2 further including the step of receiving a flag set in one of the frames on the pilot channel transmitted from the mobile station prior to the mobile station tuning from the first frequency to the second frequency; increasing power transmitted from the external station for a predetermined period after receiving the flag.

4. The method of claim 2 further including the steps of: increasing transmitted energy by said first external station per frame by splitting the time tuned by the mobile station to the second frequency across a frame boundary.

5. The method of claim 1 further including the steps of:
    measuring the present energy level in the signal transmitted from the mobile station;
    comparing the energy level in the signal received from the mobile station with a previously measured and stored energy level;
    increasing transmit power from the external station when the difference between the present energy level and the stored energy level exceeds a predetermined threshold.

6. The method of claim 5 wherein the signal received from the mobile station at said first external station includes a traffic channel.

7. The method of claim 5 wherein the signal received from the mobile station at said first external station includes a pilot channel.

8. The method of claim 5 further including the steps of:
    measuring the energy level in the signal received at said first external station from the mobile station by coherently combining individually received symbols to form a first level;
    measuring the energy level in the signal transmitted by non-coherently combining individually received symbols to form a second level;
    using a weighted average of the first and second levels for comparison with said predetermined threshold.

9. The method of claim 8 further including the step of determining the threshold based on a target for received power level, power control and pilot levels.

10. The method of claim 8 further including the step of determining the threshold based on a target received level for a previously received level of pilot, power control and traffic channels.

11. In a radiotelephone system including a mobile station and a plurality of external stations which utilizes redundant data transmission, a method of controlling transmit power for improving receiver performance by ensuring sufficient transmit power during a candidate frequency search while initiating a handoff between cells comprising the steps of:
    a) receiving information at said mobile station from an external station on a first frequency;
    b) tuning a mobile station frequency of interest from the first frequency to a second frequency;
    c) searching the second frequency for a potential pilot channel for a predetermined time period;
    d) receiving from the external station a signal with interleaved redundant information (voice or data) that has been increased in power by a predetermined amount during a time that the mobile station is tuned to the first frequency, in order to increase the probability of correct reception of the received information.

12. The method of claim 11 further including the step of transmitting a flag set in one of the frames on the pilot channel transmitted from the mobile station prior to the mobile station tuning from the first frequency to the second frequency to instruct an increase in power transmitted from the external station for a predetermined period after sending the flag.

13. The method of claim 11 further including the steps of: increasing mobile station received energy from the first external station per frame by splitting the time tuned by said mobile station to the second frequency across a frame boundary.

14. The method of claim 11 further including the steps of: prior to tuning to the second frequency, receiving at the mobile station the signal with redundant interleaved information increased in transmitted power for a predetermined time period, the time period overlapping at least a portion of the redundantly transmitted information.

15. The method of claim 11 including the steps of:
    transmitting a pilot channel from said mobile station at the first frequency; receiving power control information for power controlling the mobile station pilot channel transmit level corresponding to a target receive level at the external station;

adjusting the mobile station transmitted traffic channel power based on the pilot channel transmit level.

16. The method of claim 15 further comprising the step of: ignoring in the mobile station received power control commands, sent from the external station during said predetermined time period.

17. The method of claim 11 further including the steps of: while tuned to the first frequency, receiving at said mobile station the signal transmitted from the first external station an increased in transmitted power from the first external station for a predetermined time period prior to tuning to the second frequency.

18. The method of claim 17 further including the steps of:
receiving at said mobile station a signal increased in power based on an externally compared energy level;
measuring the present energy level in the signal transmitted from the mobile station;
comparing the energy level in the signal transmitted from the mobile station with a previously measured and stored energy level;
increasing transmit power from the external station when the difference between the present energy level and the stored energy level exceeds a predetermined threshold.

19. The method of claim 18 wherein the signal transmitted from the mobile station includes a traffic channel.

20. The method of claim 18 wherein the signal transmitted from the mobile station includes a pilot channel.

21. The method of claim 18 further including the steps of:
measuring the energy level in the signal transmitted from the mobile station by coherently combining individually received symbols to form a first level;
measuring the energy level in the signal transmitted by non-coherently combining individually received symbols to form a second level;
using a weighted average of the first and second levels for comparison with said predetermined threshold.

22. The method of claim 21 further including the step of determining the threshold based on a target for received power level, power control and pilot levels.

23. The method of claim 21 further including the step of determining the threshold based on a target received level for a previously received level of pilot, power control and traffic channels.

24. A radiotelephone system base station for improving receiver performance by ensuring sufficient transmit power during a candidate frequency search while initiating a handoff between cells including a transmitter comprising:

a controller;

a receiver for receiving a signal from a mobile station;

a transmitter for transmitting a signal with interleaved redundant information (voice or data) to the mobile station from said first external station on a first frequency at a first set power level; and then transmitting the signal to the mobile station from said base station on the first frequency at a second power level above the first set power level by a predetermined amount during a predetermined time by the controller that the mobile station is tuned to the first frequency prior to tuning to the second frequency.

25. A method of searching for forward link signals on a second frequency by a mobile station during operation by the mobile station on a first frequency, the method comprising:

transmitting a first frame, during a first frame period and at the first frequency, from the mobile station on a reverse link traffic channel at a first power level relative to a reverse link pilot channel transmitted by the mobile station;

transmitting a second frame, during a first portion of a second frame period and at the first frequency, from the mobile station on the reverse link traffic channel at a second power level relative to the reverse link pilot channel transmitted by the mobile station, wherein the second power level is greater than the first power level; and tuning the mobile station to the second frequency during a second portion of the second frame period.

26. The method of claim 25 further comprising ignoring, at the mobile station, at least one power control down command received from a base station during the transmitting a second frame.

27. The method of claim 25 wherein the second power level differs from the first power level by a predetermined amount.

28. The method of claim 25 further comprising selecting the second power level to compensate for a reverse link signal loss during the period of the second frame during the second frame period.

29. The method of claim 25 further comprising selecting the second power level based on a duration of an interfrequency search for forward link signals on the second frequency by the mobile station.

30. The method of claim 25 further comprising:
after searching for forward link signals on the second frequency, tuning the mobile station back to the first frequency; and
transmitting a third frame, during a first portion of a third frame period and at the first frequency, from the mobile station on the reverse link traffic channel at the second power level relative to the reverse link pilot channel transmitted by the mobile station.

* * * * *